(12) United States Patent
Dziadosz et al.

(10) Patent No.: US 6,679,417 B2
(45) Date of Patent: Jan. 20, 2004

(54) TAILORED SOLUTIONIZING OF ALUMINUM SHEETS

(75) Inventors: Lawrence M. Dziadosz, Milford, MI (US); Clarence W. Fulton, Oakville (CA)

(73) Assignee: Tower Automotive Technology Products, Inc., Grand Rapids, MI (US)

( * ) Notice: Subject to any disclaimer, the term of this patent is extended or adjusted under 35 U.S.C. 154(b) by 0 days.

(21) Appl. No.: 09/876,892

(22) Filed: Jun. 7, 2001

(65) Prior Publication Data

US 2002/0162877 A1 Nov. 7, 2002

Related U.S. Application Data

(63) Continuation-in-part of application No. 09/849,943, filed on May 4, 2001.

(51) Int. Cl.⁷ .................. B23K 31/02; B23K 20/16; B23K 1/19; B21D 39/00
(52) U.S. Cl. ............ 228/235.2; 228/157; 228/190; 228/193; 228/203; 228/235.3; 228/262.1; 228/262.5; 228/262.51; 148/415; 148/417
(58) Field of Search ................... 228/117, 118, 228/157, 190–194, 203–206, 262.1, 262.5, 262.51, 235.1–3; 148/415–417

(56) References Cited

U.S. PATENT DOCUMENTS

| | | |
|---|---|---|
| 2,366,185 A | 1/1945 | Diehl et al. |
| 2,383,511 A | 8/1945 | Reynolds |
| 2,957,230 A | 10/1960 | Johnson |
| 2,966,728 A | 1/1961 | Balfour |
| 2,990,608 A | 7/1961 | Manning |
| 3,003,228 A | 10/1961 | Thomas |
| 3,167,405 A | 1/1965 | Muije et al. |
| 3,293,733 A | 12/1966 | Broverman et al. |
| 3,297,082 A | 1/1967 | Tranel et al. ............... 165/170 |
| 3,312,536 A | 4/1967 | Broverman et al. |
| 3,340,589 A | 9/1967 | Jaeger |
| 3,342,565 A | 9/1967 | Munday |
| 3,436,804 A | 4/1969 | Broverman et al. |
| 3,465,406 A | 9/1969 | Myers |
| 3,496,620 A | 2/1970 | Wolfe, Jr. |
| 3,650,005 A | 3/1972 | Kamiya et al. |
| 3,884,731 A * | 5/1975 | Barkman et al. ........... 148/531 |
| 4,030,947 A * | 6/1977 | Kemper ..................... 148/415 |
| 4,077,810 A * | 3/1978 | Ohuchi et al. .............. 148/439 |
| 4,090,011 A * | 5/1978 | Barkman et al. ........... 428/653 |
| 4,336,075 A * | 6/1982 | Quist et al. ................. 148/417 |
| 4,437,901 A * | 3/1984 | Gentry ........................ 148/415 |
| 4,662,955 A * | 5/1987 | Dries et al. ................. 148/577 |
| 4,798,932 A * | 1/1989 | Dion et al. ............... 228/235.3 |

(List continued on next page.)

*Primary Examiner*—Tom Dunn
*Assistant Examiner*—L. Edmondson
(74) *Attorney, Agent, or Firm*—Van Dyke, Gardner, Linn & Burkhart, LLP

(57) ABSTRACT

An efficient and effective process for manufacturing of hardened aluminum components is achieved by coordinating the material preparation steps with the forming steps. The resulting product is a hardened aluminum component with desirable strength characteristics. The process includes initial heating of sheet material in order to prepare it for further processing. The sheet material is then quenched to promote appropriate material conditioning. A product forming sub-process is then undertaken in a relatively short period of time following the quenching. The product forming is done while the material is in a relatively ductile condition, thus easing forming operations, and avoiding product spring-back problems. Lastly, the component is naturally aged, to provide the final hardening operations. The resulting product has very desirable strength characteristics, due to the combined forming and hardening process.

32 Claims, 13 Drawing Sheets

U.S. PATENT DOCUMENTS

| | | | | |
|---|---|---|---|---|
| 4,820,355 A | * | 4/1989 | Bampton | 148/535 |
| 5,025,974 A | * | 6/1991 | Strickland | 228/107 |
| 5,070,607 A | | 12/1991 | Boardman et al. | 29/890.042 |
| 5,234,662 A | * | 8/1993 | Balmuth et al. | 148/416 |
| 5,333,775 A | * | 8/1994 | Bruggemann et al. | 228/155 |
| 5,353,868 A | * | 10/1994 | Abbott | 165/171 |
| 5,388,440 A | | 2/1995 | Folmer | 72/62 |
| 5,392,625 A | | 2/1995 | Cesaroni et al. | |
| 5,507,888 A | * | 4/1996 | Dickson et al. | 148/415 |
| 5,603,449 A | | 2/1997 | Mansbridge et al. | |
| 5,718,780 A | * | 2/1998 | Bryant et al. | 148/526 |
| 5,729,463 A | * | 3/1998 | Koenig et al. | 700/98 |
| 5,785,777 A | * | 7/1998 | Cantrell et al. | 148/690 |
| 5,911,844 A | | 6/1999 | Benedyk | |
| 6,033,499 A | * | 3/2000 | Mitra | 148/688 |
| 6,098,262 A | | 8/2000 | Thoms et al. | |
| 6,267,830 B1 | * | 7/2001 | Groll | 148/531 |
| 6,274,015 B1 | * | 8/2001 | Beier et al. | 148/415 |

* cited by examiner

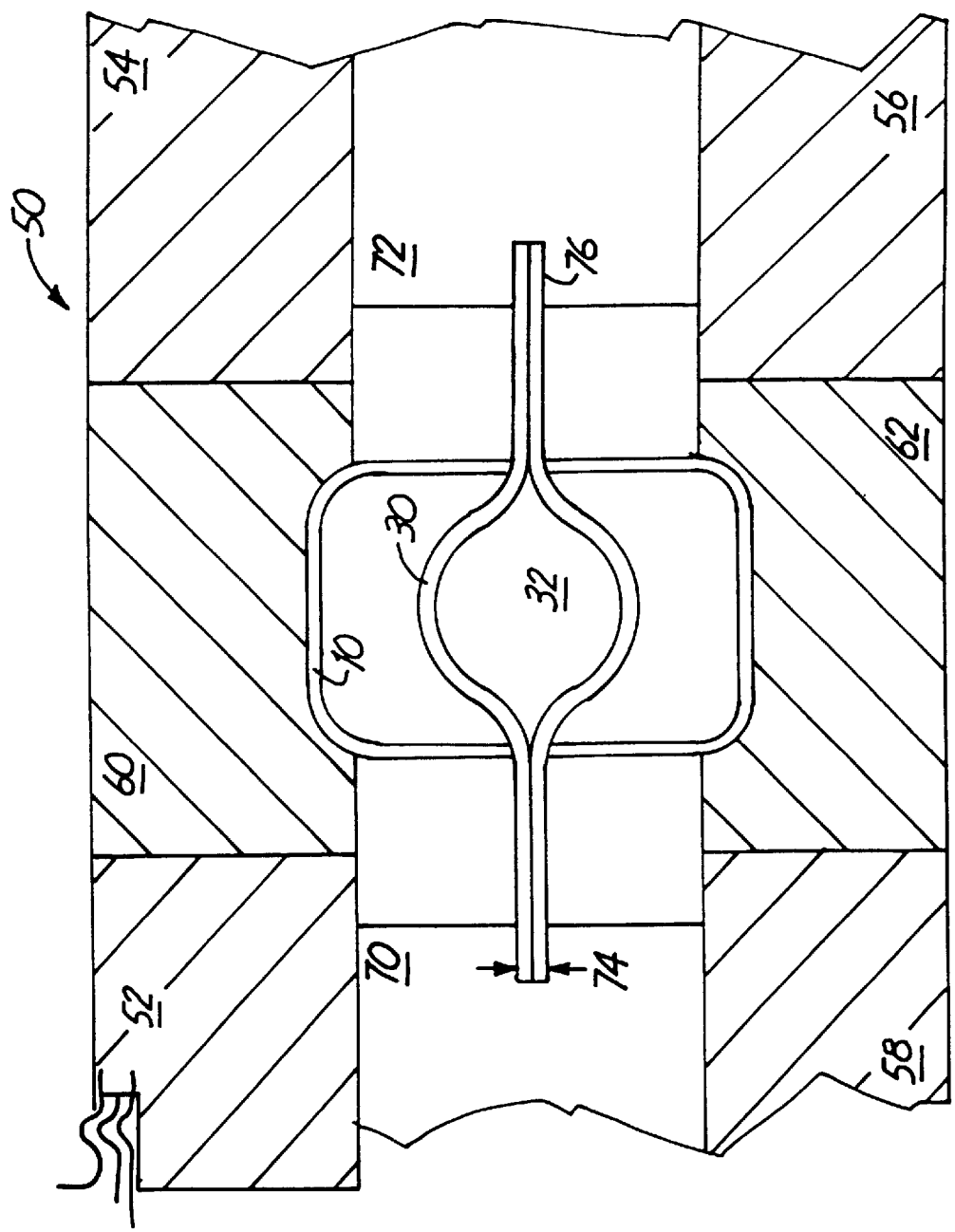

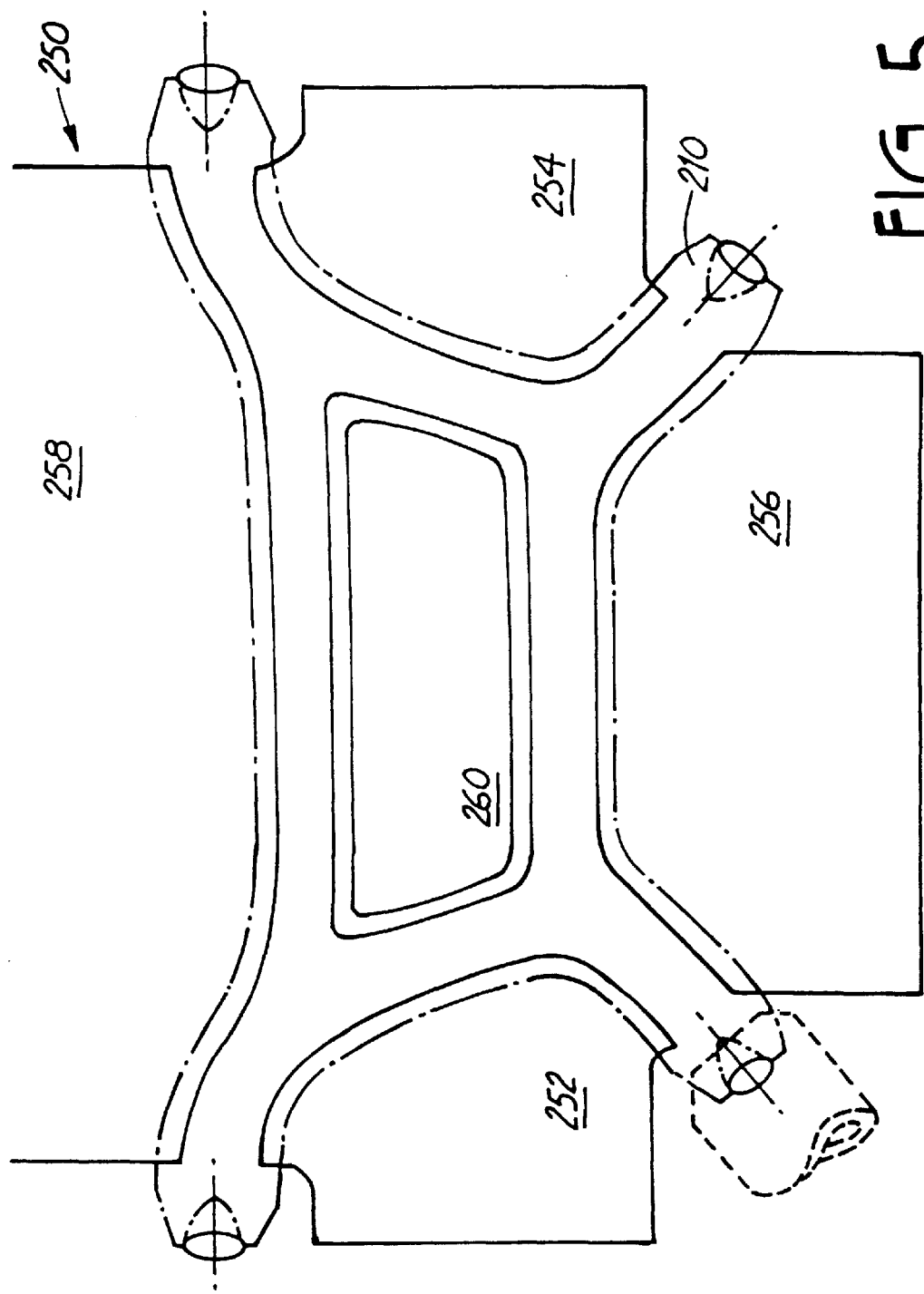

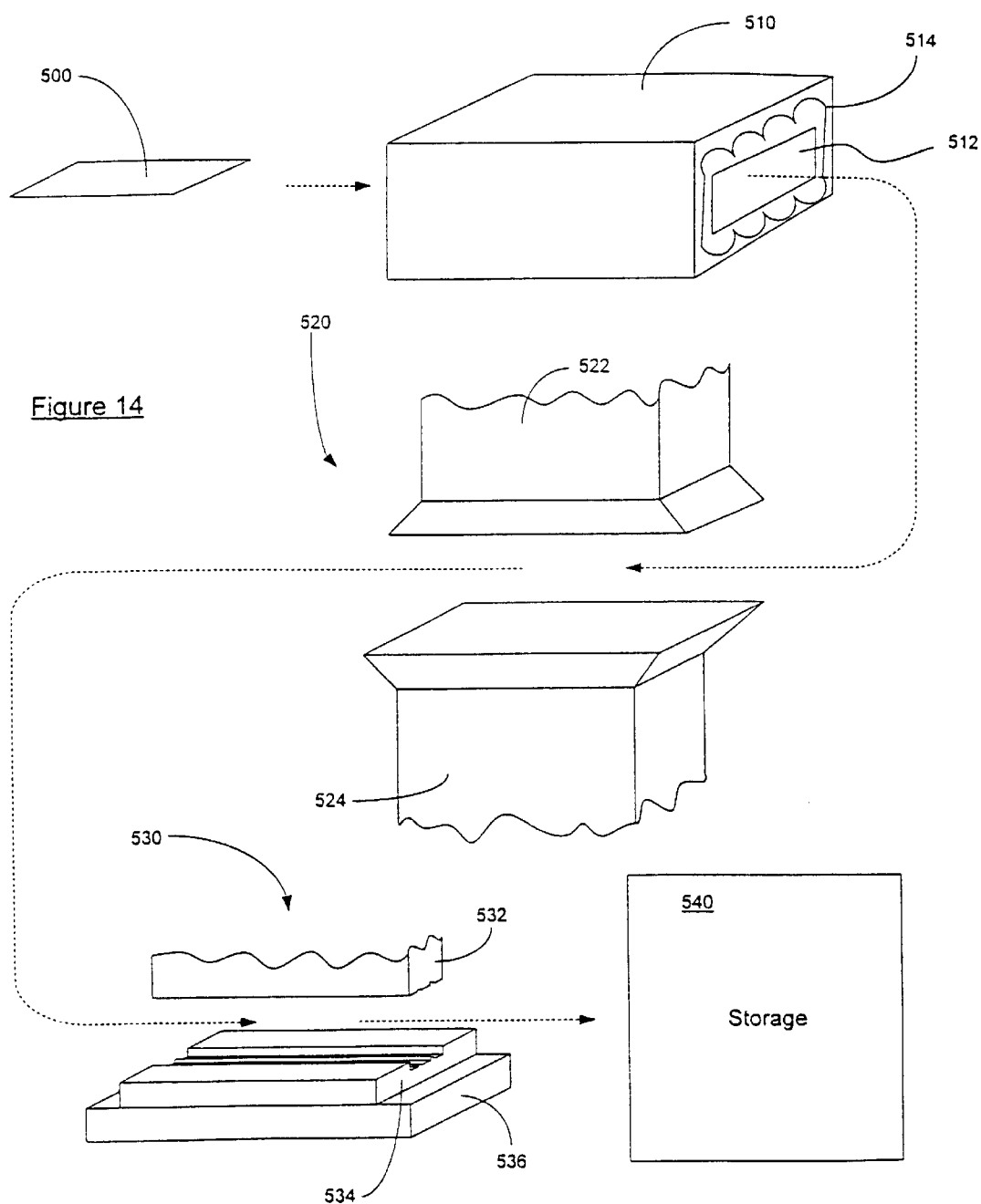

TAILORED SOLUTIONIZING OF ALUMINUM SHEETS

CROSS REFERENCE TO RELATED APPLICATIONS

This application is a continuation-in-part of U.S. application Ser. No. 09/849,943, filed on May 4, 2001.

BACKGROUND OF THE INVENTION

The present invention relates to a method and system for the fabrication of component parts. More specifically, the present invention relates to an overall method and system to create reliable and structurally sound component parts.

As is well known, strong, robust and reliable component parts are necessary for many applications. The tempering of component parts provides many benefits, such as the necessary material strength and desirable structural characteristics. One classical method of tempering involves placing component parts into a large heating furnace to elevate the component temperature to a high level. Subsequently, the parts are removed from the heating furnace and placed in a large cooling bath. This cooling bath is typically made up of a very large pool of water which allows the parts to be completely submerged. When placed in this cooling bath, the temperature of the component parts will quickly drop down to desired levels. This process achieves various temper levels including, O, F, T-4, and T-6 (and possibly others). Obviously, the strength and hardness of the raw material itself will greatly affect the performance of the resulting end product.

As would be expected, the heating furnace and the cooling bath typically used are both very large components which require large amounts of space in a manufacturing facility. This is especially true when manufacturing fairly large component parts.

In addition to the large amounts of manufacturing space, complex and complicated material handling mechanisms are often required. Each time parts are handled by various mechanisms, surface contamination becomes a concern. Specifically, it is important that the various surfaces of the material remain clean and free of contamination in order to accommodate further processing. For example, it is important to avoid the formation of oxides if roll bonding is anticipated. Naturally, there may be other contamination issues which may arise.

The incorporation of heat treating steps into the overall manufacturing process must also be carefully considered. As is well known, the quenching of formed components may have an adverse affect on component configuration. For example, if a component is stamped to have a desired cross-sectional configuration, and then quenched, the product configuration may change. Should this happen, the product must then be restriked or reformed, in order to achieve the most desired configuration once again. Obviously, the restriking or reforming of parts creates additional costs and complications to the manufacturing process. Thus, by carefully considering this potential problem during the manufacturing operations, this can easily be avoided.

Similarly, the proper incorporation of the heat treating steps and manufacturing may provide manufacturing advantages and capabilities not otherwise obtainable. Using a process known as retrogression heat treating, a material can be heated to achieve a lower temper in order to accommodate certain manufacturing operations. Examples of retrogression heat treating can be found in U.S. Pat. No. 5,911, 844 entitled "Method for Forming a Metallic Material", and, U.S. Pat. No. 6,033,499 entitled "Process for Stretch Forming Age Hardened Aluminum Alloy Sheets". Both of these patents deal with the localized heating and forming of component parts, in order to accommodate product forming.

When manufacturing products using 6000 series aluminum sheets, raw material is often supplied at an "F temper." However, in order to increase the strength of this material, the tempering process would preferably be used to create parts having a T-6 temper.

When manufacturing component parts, roll bonding is one efficient method available. In this process, two sheets of material are introduced to a roll bonding mill whereby they are compressed or sandwiched together to create a molecular bond between the two sheets. By selectively patterning a bond inhibitor (e.g. a graphite, titanium dioxide ($TiO_2$), or like material) the bond can be created in selected areas while avoided in other areas. The two sheets of material can be selectively separated at a later time (as dictated by the bond pattern), to create several structural components. For example, manifolds that require fluid flow in a predetermined pattern or area can easily be fabricated utilizing this process. The process of roll bonding is further outlined in U.S. Pat. Nos. 3,340,589 and 2,957,230.

As appreciated by those familiar with this technology, roll bonding is best suited for relatively thin sheets of material. Using these thinner sheets allows for the easy handling by the rolling mill because only limited separation between work rolls is required. Consequently, roll bonding has traditionally been best suited for non-structural components such as manifolds, etc.

In automotive applications, there are needs for all types of manufactured components. One such category is structural components such as frames, load bearing members, bracketry, etc. Naturally, many of these have a fairly significant weight handling and strength requirements. Consequently, when trying to implement these structural components in aluminum, structural aluminum is typically best suited. This structural aluminum includes 5,000 and 6,000 series aluminum alloys which typically contain some portion of magnesium. 3,000 series alloys may also be used.

Due to the magnesium contained in typical structural aluminum, it traditionally has not been easily roll bonded. When heated prior to introduction into the roll bonding press, an oxide is often created on the surface. This oxide prohibits the aluminum from easily being bonded. The weight handling requirements, combined with the complications of roll bonding structural aluminum, have typically suggested that roll bonded structures could not be easily used for these automotive applications.

In addition to the weight handling capabilities that are required for automotive component applications, actual weight is a continuing consideration. Naturally, automakers are constantly looking for ways to reduce weight, thus increasing fuel economy, etc. This naturally suggests that aluminum would be an appropriate material for use in automotive components due to its weight characteristics. However, aluminum has inherent strength constraints. Consequently, steel has traditionally been used to achieve the required strength and other methods have been attempted to reduce weight.

As mentioned above, certain structural aluminum alloys certainly do display strength characteristics which would allow their use as structural components. Two primary complications exist with the use of aluminum components, however: (1) the aforementioned complications in roll bonding high strength aluminum alloys, and (2) additional raw material required to achieve the necessary strengths. To obtain these necessary strengths, heavier gauges of material is often required. This inherently requires the use of more raw materials—a raw material which is more expensive than steel to start with. Consequently, other methods (beyond simply using heavier gauge materials) are necessary in order to achieve the desired strength while staying within cost constraints.

Roll bonding itself provides further advantages by allowing the formation of complex structures due to the ability to create intricate patterns of bond inhibitor. More specifically, curves and/or bends can easily be created by appropriate patterning of the bond inhibiting material pattern. Similarly, diameter variations can also be easily accomplished.

In light of the above advantages, it would be beneficial to utilize the processes of roll bonding to create structural members. Further, the tempering of these parts is further beneficial.

Another technology which is becoming widely used in the fabrication of structural components, including aluminum components, is hydroforming. As is well known, hydroforming involves the placement of a preformed blank within the hydroforming die and injecting a fluid into a closed interior cavity of the blank. The fluid is pressurized to a predetermined level, which causes the blank to expand until meeting the interior wall surface of the die. Hydroforming is a very advantageous process in that various configurations can be easily achieved. Most hydroforming processes utilize a traditional blank which is configured as a typical tube of some type. This tube may be a blank pipe, or may take on other shapes. In order to accomplish forming, the blank must include an enclosed cavity to accommodate fluid injection.

Traditionally, hydroforming of complex structures is not possible due to various limitations in tube forming and product expansion. As it is well known, products cannot be expanded beyond certain limits. Further, hydroforming of flat blanks (or blank structures which are substantially flat when placed in the hydroforming die) is very complex and traditionally impractical. As previously mentioned, the base material cannot realistically be expanded beyond a certain level. Consequently, the aforementioned tubes have been used as a convenient starting point because only limited expansion has been required.

As can be appreciated, roll bonding further provides advantages in the formation of complex structures due to the ability to create very intricate patterns. More specifically, curves and/or bends can easily be created by appropriate forming of the bond inhibiting material pattern. Similarly, diameter variations can also be easily accomplished.

In light of the above advantages, it would also be beneficial to combine the processes of tempering, roll bonding, and hydroforming to create structural members.

SUMMARY OF THE INVENTION

To efficiently manufacture T-6 tempered parts, an integrated process is utilized which includes the coordination of both tempering and the product forming operations mentioned above. This process begins with F series coiled aluminum sheets, which are first preformed into a desired configuration. For example, the sheets may be formed into appropriate blanks. Next, the blanks are induction heated to a relatively high temperature (e.g., 540° C.). The parts are then quenched using appropriate quenching methods. In the case of 6000 series aluminum, this quenching is easily accomplished by such methods as air quenching or water spray quenching. Immediately following the quenching operations, the parts are typically in a fairly ductile condition. In order to take advantage of this condition, the parts are immediately formed using appropriate forming methods such as stamping, blow molding, hydroforming, extrusion, etc. Finally, the parts are stored for a predetermined period of time—approximately two to three weeks under standard conditions,—to accommodate the natural aging process. This time period may be slightly accelerated due to other manufacturing operations that will be undertaken. For example, parts that are electro-coated (e-coated) will be exposed to moderate periods of time at raised temperatures, which will naturally accelerate the aging process. Through either the natural aging process, an accelerated aging process, or a combination of the two, a T-6 temper is achieved.

This manufacturing process, and the systems for its implementation, provide several advantages over the traditional forming and quenching operations. Most importantly, it is more efficient and cost effective. Through the use of induction heating and air quenching, very sizeable manufacturing components are eliminated. For example, the typical heating furnace and water quenching bath is replaced with much smaller components. As can be expected, this frees up a considerable amount of manufacturing space in addition to providing a more efficient quenching process. Additionally, the tempering and product forming operations are integrated, thus eliminating processing steps. Specifically, by forming the product immediately following quenching eliminates the possibility of introducing distortion.

In its preferred form, the manufacturing process described herein preferably begins with F-tempered aluminum stock in various forms. In one embodiment, the above discussed steps of roll bonding are undertaken to create a roll bonded blank. This roll bonded blank has all desired internal bonds, however, the unbonded portions have not yet been separated. Consequently, the roll bonded blank is in a substantially sheet like configuration at this point in the process.

Next, the roll bonded blank is induction heated to a desired temperature. This induction heating is part of the initial tempering process. Shortly after this induction heating step, the roll bonded blank is then formed into its final part configuration. This forming step or forming process may include stamping, bending, and/or hydroforming. More specifically, the most efficient combination of manufacturing steps is utilized to produce the resulting part. Following this forming step, the part is transferred to a holding or storing location where it is stored at room temperature for some predetermined period of time. This room temperature storage will cause natural aging of the component part. This natural aging allows the component to achieve its desired hardness (preferably a T-6 temper).

An alternative forming process will include the combination of roll bonding and hydroforming. While both hydroforming and roll bonding is described below, clearly various aspects of either process alone could advantageously be utilized to create structural components.

To begin this process, roll bonding of structural aluminum is done utilizing a modified process. As previously mentioned, roll bonding of structural aluminum has traditionally not been practical due to the formation of oxides on the surfaces of these aluminum alloys. In order to avoid the creation of oxides, the structural aluminum component is manufactured by a lower temperature, quick preheating step which eliminates the creation of oxides on the surfaces while performing the necessary material preparation. As an additional measure, the preheating chamber could easily be treated with nitrogen as further step in avoiding oxide formation. In order to create the required configuration of parts, the bond inhibitor, or "stop weld" can be appropriately patterned on the raw material. This is then sent through the roll bonding mill. The roll bonded stock is then stamped in predetermined patterns which correspond to the roll bonding pattern, to create flat stock blanks.

These flat stock blanks are then hydroformed into structural members. A unique hydroforming process is used which includes some preforming, in order to accommodate insertion into the hydroformed structure. Also, a hydroform tool is required for controlling the expansion of the aluminum during the hydroformed process.

The hydroform process itself, starting with flat stock, has not been done in the past due to the expansion characteristics required. Specifically, hydroforming has not been done with roll bonded sheets specifically configured to create the desired tubes. Because the process is being started with flat stock (rather than a tube), the hydroform fixture must more closely control the way the metal expands.

In order to accomplish this hydroforming, a very unique hydroforming fixture is created which has multi-component die which is specifically configured to accommodate the part being fabricated. Most importantly, the die has various clamps and moveable components which will initially receive and hold the flat stock blank. During the actual hydroforming process thereafter, this fixture will then adjust or move as necessary with the expanding blank. Consequently, over stressing of the aluminum material is avoided during the process.

While roll bonding step has been described above, it is understood that other forming processes could be used at the initial stages of manufacturing. For example, extruded parts, welded blanks, or precut sheet stock could be equally utilized, depending on the particular product configurations involved.

The configuration of the finished part can also provide for and strong and robust parts. In one embodiment of the finished components utilizes a unique waffle-type pattern which is created via roll bonding. This waffle pattern has a plurality of bond points located throughout its structure. The appropriate placement of a bond inhibitor during the roll bonding process, allows this waffle-type structure to be created. After the roll bonding step is completed, the two sheets of aluminum alloy are separated (at those points where no bond exists), thus creating the three dimensional waffle-type structure as desired.

Due to the three-dimensional structure created, the waffle material allows for greater weight bearing capabilities. More specifically, loads are distributed throughout the structure of the material so that concentrated stress points are avoided.

In order to create these load-bearing structures, two sheets of aluminum alloy material are first chosen of appropriate dimension and thickness. Next, a bond inhibiting material is patterned on one surface of one sheet. The two sheets are then positioned with their major surfaces adjacent one another (and the bond inhibiting pattern therebetween), and are introduced to a roll bonding mill. As well-known, these roll bonding mills have at least two work rolls that are separated by a predetermined distance, and are controlled to provide appropriate pressures to the material sheets introduced therebetween. This creates the desired bond between the material sheets at the desired locations.

Next, an appropriate process is used to separate the sheet material at the unbonded locations. This process may include the use of pressurized air or fluid which is injected between the sheets at the unbonded locations. Further, a forming die may be used to closely control the expansion. This forming process may be very similar to the above discussed process of hydroforming. At this point, the three dimensional waffle-type structure is created which can then be subjected to further operations. For example, additional cutting may be required to achieve a desired configuration. Similarly, bending or other forming operations may be utilized to further form the component into its desired configuration.

Again to allow the efficient use of the roll bonding process in creating this waffled structure, additional steps are necessary to achieve roll bonding of structural grade aluminum. As mentioned above, roll bonding may be accomplished in an enclosed chamber which has a very controlled environment. More specifically, a nitrogen gas, or other appropriate gas may be injected into the chamber and all oxygen removed. This provision would avoid the creation of oxide on the surface of the aluminum sheets. Alternatively, a low temperature, quick preheating step may be used. To further strengthen this part, solutionized heat treating is also incorporated.

It is an object of this manufacturing process to create hardened products which do not require any restriking or reforming after the initial product forming is done. This object is achieved by having the forming step completed immediately following the heating step.

It is a further object of the present manufacturing method to easily form products at a point when the material is easily formable. As mentioned above, this occurs immediately after the heating step resulting in somewhat pliable or formable materials.

BRIEF DESCRIPTION OF THE DRAWINGS

Further objects and advantages of the invention can be seen from reading the Detailed Description of the Invention in conjunction with the drawings in which:

FIG. 3 is a cross sectional diagram of the hydroforming fixture illustrating the moveable die components;

FIG. 5 is a top view of an alternative blank and a hydroforming fixture utilizing the process of the present invention;

FIG. 14 is a schematic diagram illustrating the systems and process for solutionized heat treating.

DETAILED DESCRIPTION OF THE INVENTION

Through the combined heat treating and new product forming of aluminum products, component parts having a T-6 temper can easily be produced in a cost effective and efficient manner. More specifically, T-6 temper component parts can be manufactured from F series aluminum sheet stock in a very flexible and adaptable manner.

While aluminum alloys are available in various hardnesses, it is always most cost effective to utilize the optimum material. Clearly, as hardnesses move from an O temper to a T-6 temper, the cost of materials increases. More specifically, O temper of materials are much less expensive than T-6 tempered materials. Obviously, it is most cost effective to begin with the lowest hardness practical. In most cases, this is an O temper or F temper material supply.

Figure 13:
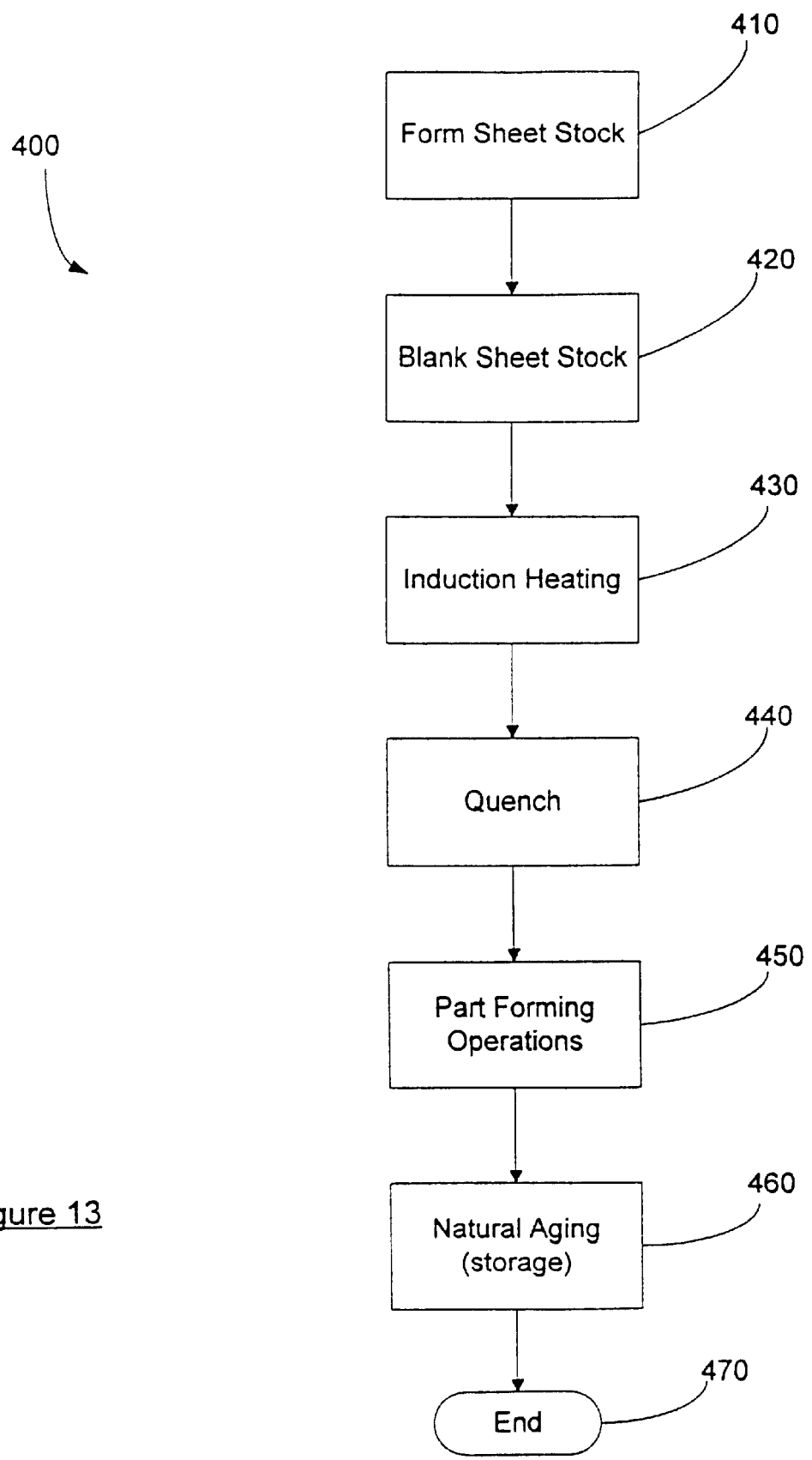
FIG. 13 is a flow chart illustrating the heat treating steps of the present invention.

As set forth in the flow chart of FIG. 13, the heat treating process 400 begins by first doing preforming operations on coils of F-temper 6000 series aluminum to create manageable components. This step is shown as step 410 of the flow chart of FIG. 13. These preforming operations most often involve the simple unrolling of aluminum stock into sheets. Next, in step 420 this sheet stock is blanked in appropriate configurations. The actual configurations of these blanks will depend upon the forming operations anticipated later in the process. Many different cutting operations can be used to form these blanks.

While FIG. 13 refers to creating blanks, it is clearly understood that this term is intended very generally, to include many different forming operations. For example, a continuous casting process may clearly be used to form the initial materials. Alternatively, direct chilling could be utilized or some form of extrusion. Selection of the appropriate initial part fabrication will depend largely on the component itself, and the manufacturing efficiencies that are available.

As yet another alternative process, the initial steps of roll bonding may be undertaken at this point. For example, the aluminum sheets would be appropriately screened and sent through a roll bonding mill. Next, the roll bonded blanks would be die cut using appropriate stamping processes.

At this point in the process, the components can be in many configurations, including a substantially flat sheet configuration. Further, the components have been cut or stamped into appropriate configuration for later processing operations. Next, as shown in step 430, the blanks are sent through an induction heating coil for appropriate heating. Induction heating is possible due to the generally flat or planar nature of the components. More specifically, an induction heating mechanism (i.e., induction heating coils) can easily be configured to accept such components. As expected, components with some amount of contour or curvature can be accommodated, so long as these components will fit into the induction heating mechanism.

Referring again to FIGS. 13 and 14, the step of induction heating is shown in the flow chart of FIG. 13 as step 430. Referring specifically to FIG. 14, it can be seen where the planar component or blank 500 is introduced into the interior 512 of induction heating mechanism 510. As is expected, induction heating mechanism 510 includes an induction heating coil 514 which is specifically designed to surround component 500 while it passes therethrough.

Following the heating of component 500, it is necessary to quench. As can be seen in FIG. 13, this quenching step is shown as step 440 in this flow chart. Appropriate quenching can be achieved through various mechanisms. The necessary cooling curve will be dictated by the specific materials being used and can also dictate the appropriate cooling mechanisms. For example, quenching could be achieved through simply exposing the component part to ambient air as it exits induction heating mechanism 510. Referring to FIG. 14, there is shown an air draft system 520 which consists of an upper air duct 522 and a lower air duct 524. In this particular configuration, cooling air is directed on to the product through these air ducts. As anticipated, necessary fans or blowers (not shown) would be appropriately connected to upper air duct 522 and lower air duct 524. As an alternative, water spray quenching could also be used to appropriately cool the materials.

Following the quenching step, the product forming steps are undertaken. To make components easier to work with, the components are in a somewhat ductile condition due primarily to the existing material temperatures. Due to this condition, it is advantageous to begin product forming operations. Referring again to the flow chart of FIG. 13, this product forming operation is shown as step 450 in overall process 400. As it can be imagined, several manufacturing methods could be used including bending, stamping, blow molding, hydroforming, impact extrusion, etc. If roll bonding is used, the parts can be cracked and molded at this point in the process. As is well known, this would typically involve introducing a fluid (air) into the area between the two bonded sheets. The process shown in FIG. 14 involves stamping of component 500 using a die press 530. Generally speaking, die press includes an upper die 532 and a lower die 534. Lower die 534 is positioned on a base member 536 as is well understood, pointer blank 500 is appropriately positioned within die press 530 for forming operations. Next, upper die 532 is moved or pressed into contact with planar component 500 and forced into a cavity in lower die 534. Using appropriate amounts of force, the planar sheet component is configured to match the shape of upper die 532 and lower die 534.

As is generally well-known, aluminum alloys and specifically 6061 alloy, naturally age from F temper to T-6 temper over long periods of time. However, this time period is excessively long when compared with manufacturing processes. Consequently, it is not feasible to simply rely on this natural aging process.

The final step in the manufacturing operation is the natural aging of the component for a predetermined period of time. In the most preferred method of the invention, this aging process simply involves storing the component part at ambient temperature for two to three weeks. As can be seen in FIG. 14, a storage rack 540 can easily be used to accommodate this aging step.

While natural aging is simple and easy to accomplish, other processes may be incorporated or considered. Existing manufacturing processes, or further part processing, may modify the aging process in different ways. For example, if a component is electro-coated (e-coated) to provide additional part protection, the e-coating process will result in accelerated aging. As is known, in the process of e-coating the part is exposed to elevated temperatures for a period of time. In one embodiment, the parts are heated to approximately 350 F for a period of approximately 30 minutes. This elevation of temperature will accelerate the aging process, allowing the parts to reach a T-6 temper in a shorter period of time. Note that many different temperature levels are possible, and their effects can vary.

By natural aging in this manner, the component part is less susceptible to deflection and bending typically caused by heating or cooling operations. Further, through induction heating and air cooling, manufacturing floor space is efficiently used. Historically, quenching has involved large heating furnaces used in conjunction with cooling baths or cooling pools. Both of these components are typically very large and take up large amounts of manufacturing space. In contrast, the induction heating systems contemplated are relatively small and can be somewhat compactly configured. Similarly, air cooling can be accomplished using relatively small systems. In some cases, no specific cooling system is necessary as the component part can be appropriately cooled using ambient air alone.

Significantly, in their most preferred form, these roll bonded blanks are fabricated from structural aluminum, which has historically not been easily roll bonded.

Figure 1:
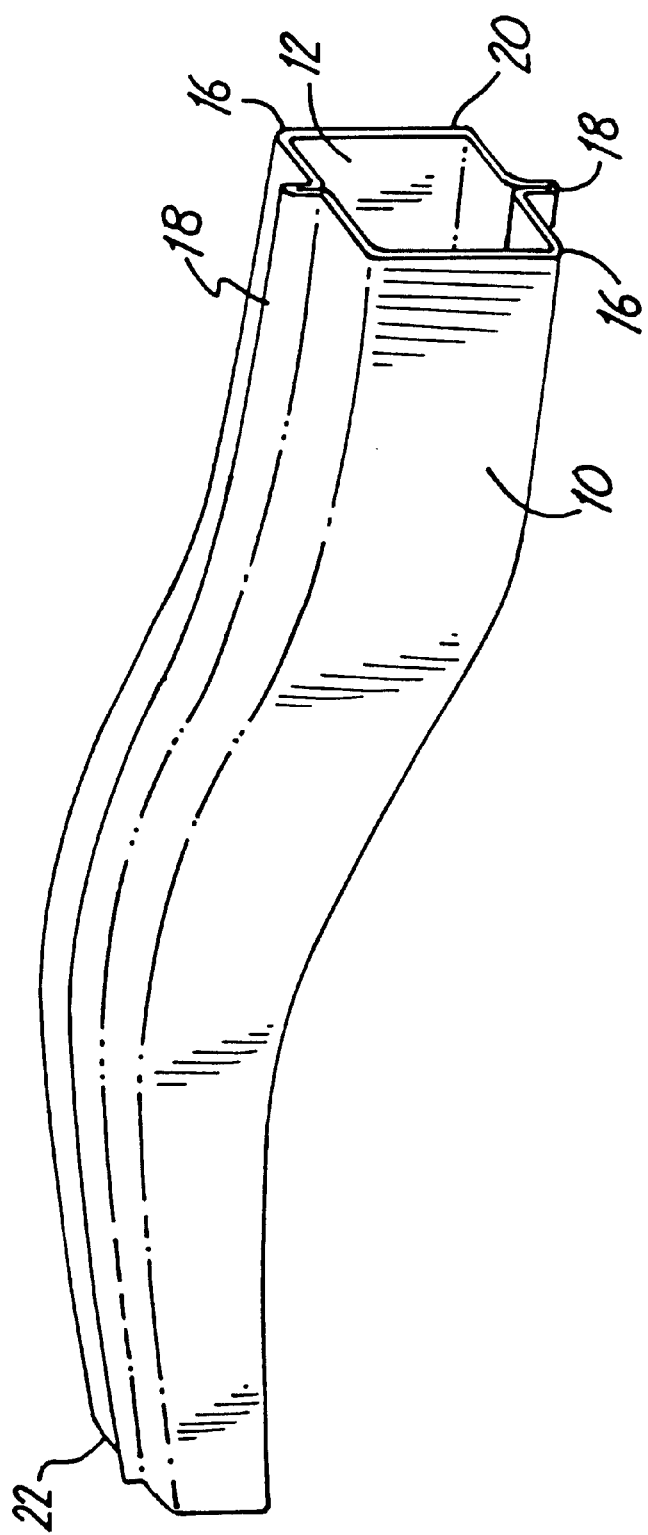
FIG. 1 is a perspective view of one finished structural component fabricated utilizing the process of the present invention.

In one form, the above referenced process of tempering is combined with the processes of roll bonding and hydroforming to efficiently create a manufactured component. Referring to FIG. 1, there shown a structural component 10 manufactured utilizing the combined roll bonding and hydroforming processes. As can be seen, this component is substantially tubular in nature having and enclosed portion 12 surrounded by a first side wall 14 and a second side wall 16. A pair of flanges 18 extend from a first end 20 to a second end 22.

In order to roll bond structural aluminum, it is necessary to control the formation of oxides. Thus, the actual roll bonding process includes quick preheating to a relatively low temperature immediately prior to roll bonding. Thus oxides are avoided. As a further measure, nitrogen may be introduced into the preheating chamber.

Figure 2:
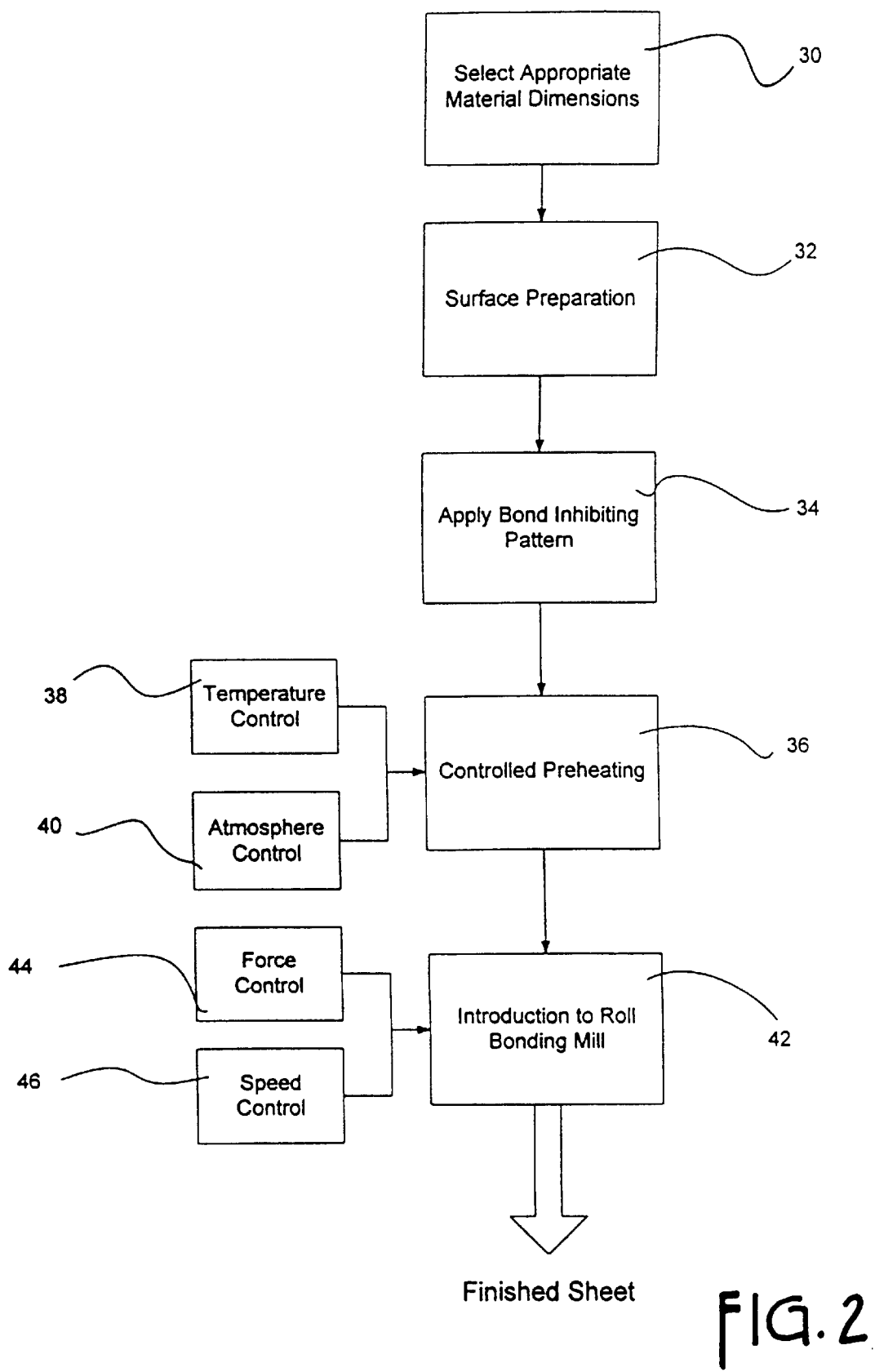
FIG. 2 is a flow chart illustrating the basic steps involved in roll bonding of structural aluminum sheets.

Referring now to FIG. 2, there shown a basic flow chart outlining the steps involved with roll bonding of structural aluminum components. As anticipated, the process begins by selecting the appropriate materials in step 30. This obviously requires appropriate width and length dimensions, but more importantly includes the appropriate selection of the correct material thickness.

Next, all surface preparation steps are provided in step 32. This includes appropriate cleaning and surface preparation of the surfaces to be roll bonded. Next, in step 34, a bond inhibiting pattern is applied to appropriately control the bonding locations. This step often involves the screen printing of graphite pattern onto one surface of the roll bonding materials.

Next, in step 36, the two sheets which will be roll bonded are appropriately preheated. As previously mentioned, in order to allow the appropriate roll bonding of structural grade aluminums, it is necessary to avoid oxide formation. One way to avoid this oxide formation is by using a lower temperature, short time period preheating step. Obviously, this requires the related step of temperature control 38. Alternatively, atmospheric control 40 can be used to similarly avoid oxide formations. For example, the preheating chamber may include a nitrogen gas to discourage the formation of oxides.

Next, the two aluminum sheets are presented to the roll bonding mill in step 42. As appreciated, this involves the application of force to compress the sheets, thus forming appropriate bonds at the desired locations. Obviously, force control 44 is required along with speed control 46. Following the pass through the roll bonding mill, a finished roll bonded sheet is then produced which can be presented to later forming steps.

Referring now to FIG. 3, there shown a partial cross sectional diagram of the hydroforming device 50 utilized to form the structural component 10. Hydroforming device 50 includes four fixed support portions 52, 54, 56 and 58 each of which are held in a substantially fixed position. An upper die 60 and a lower die 62 are also held in a relatively fixed position and are held in place by fixed support portions, 52, 54, 56 and 58. Additionally, hydroforming device 50 includes a first slide member 70 and second slide member 72. First slide member 70 includes a clamping portion 74 for holding flange 18 during the forming process. Similarly, second slide member 72 also includes a clamping portion 76 for holding the flange 18.

As seen in FIG. 3, a blank 30 is initially inserted into hydroforming device 50 such that the flanges 18 are held in first clamp 74 and second clamp 76. Next, the typical hydroforming operation is undertaken whereby fluid is injected into the interior 32 of blank 30. This fluid is then pressurized causing blank 30 to expand. During this expansion, first slide 70 and second slide 72 are moved inwardly, thus allowing the blank to expand in a controlled manner. Ultimately, first slide 70 and second slide 72 are moved to their final position thus allowing structural component 10 to be expanded to meet upper die 60 and lower die 62. This results in the structural component 10 manufactured utilizing the hydroform process.

It should be noted that blank 30 as shown in FIG. 3 has been partially opened to create interior 32. While this preforming accommodates the hydroforming step, this separation or opening of the blank could also be done during the actual hydroforming step.

As can be imagined, several complex configurations for upper die 60 and lower die 62 can be obtained. These configurations can include various curves and bends which are not otherwise obtainable in traditional hydroforming. Through the use of a hydroforming device which includes moveable components, the hydroforming process can be easily controlled thus allowing controlled expansion of the blank.

The blank 30 shown in FIG. 3 can easily be fabricated using a traditional roll bonding process. As expected, a bond inhibiting material can be placed on the meeting surfaces of the two roll bonded sheets thus avoiding a bond at the center portion while creating a secure bond at the flanges. Subsequently, through appropriate hydroforming operations the two sheets can be separated and expanded thus creating the structural component desired.

Figures 4A, 4B:
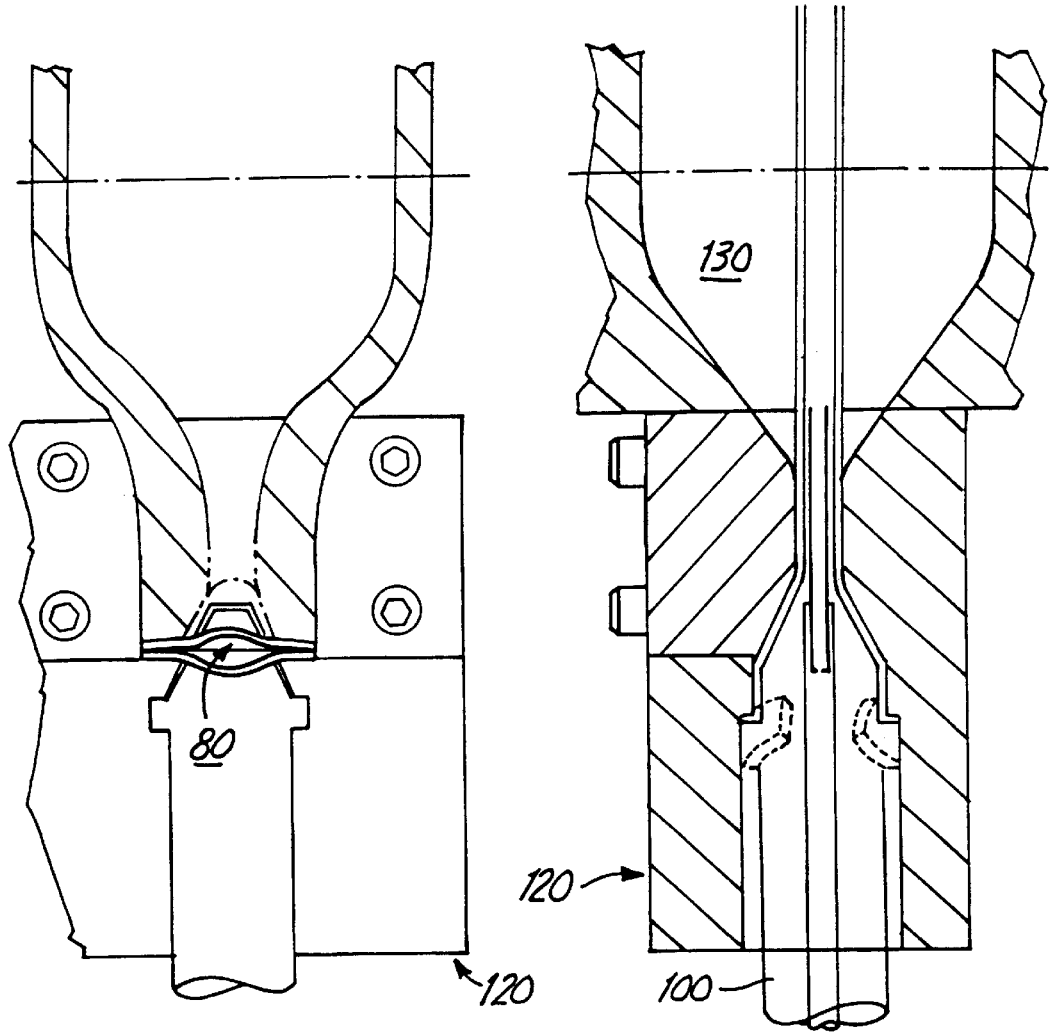
FIGS. 4A and 4B are two cross sectional views of the hydroforming fixture utilized to implement the present invention.

Referring to FIGS. 4A and 4B there is shown a top cross sectional drawing (FIG. 4A) and side sectional partial cross sectional drawing (FIG. 4B) illustrating a portion of the hydroforming operation. As anticipated, these portions accommodate the insertion of an intensifier 100 into a mounting block 120. It is anticipated that a quick lock device is utilized which can easily be inserted and removed from the block 120. Such a device utilizes a ¼ turn to lock in place and a ¼ turn to subsequently release. As seen in FIG. 4A, the intensifier 100 can be inserted into an opening 80 in the end portion of the roll bonded blank. Subsequently, the hydroforming process is undertaken allowing the expansion of the blank to meet the walls of die cavity 130.

Referring FIG. 5 there is shown a schematic diagram illustrating the application of the present invention to an alternative part. In this configuration, a complex blank 210 is shown as inserted into a hydroforming device 250. Hydroforming device 250 includes multiple slide members including first slide 252, second slide 254, third slide 256 and fourth slide 258. In hydroforming operations, each of these slides will move towards a central clamping structure 260, thus appropriately controlling expansion of blank 210.

Figure 6:
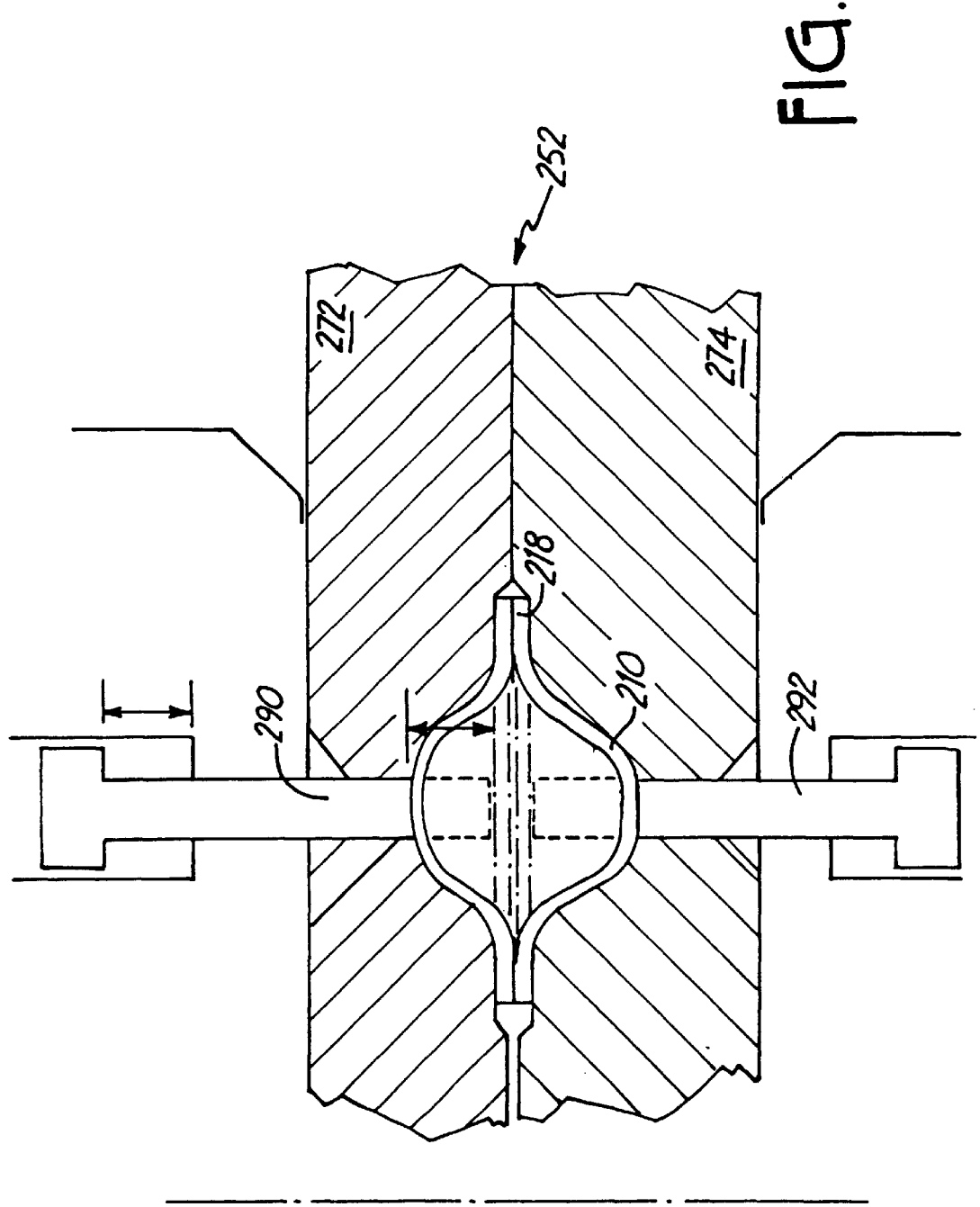
FIG. 6 is a partial cross sectional of the hydroforming structure shown in FIG. 4.

FIG. 6 illustrates a partial cross sectional drawing of hydroforming device 250 which will accommodate the hydroforming of blank 210 as shown in FIG. 5. As expected, slide 252 includes an upper slide member 272 and a lower slide member 274 which again clamp on to a flange 218 of blank 210. During hydroforming, first slide 252 will move inwardly (towards the left in FIG. 6) while the component is pressurized. This results in controlled expansion of the die. In FIG. 6, and upper control pad 290 and a lower control pad 292 are further utilized to appropriate control expansion within hydroforming device 250.

Figure 7:
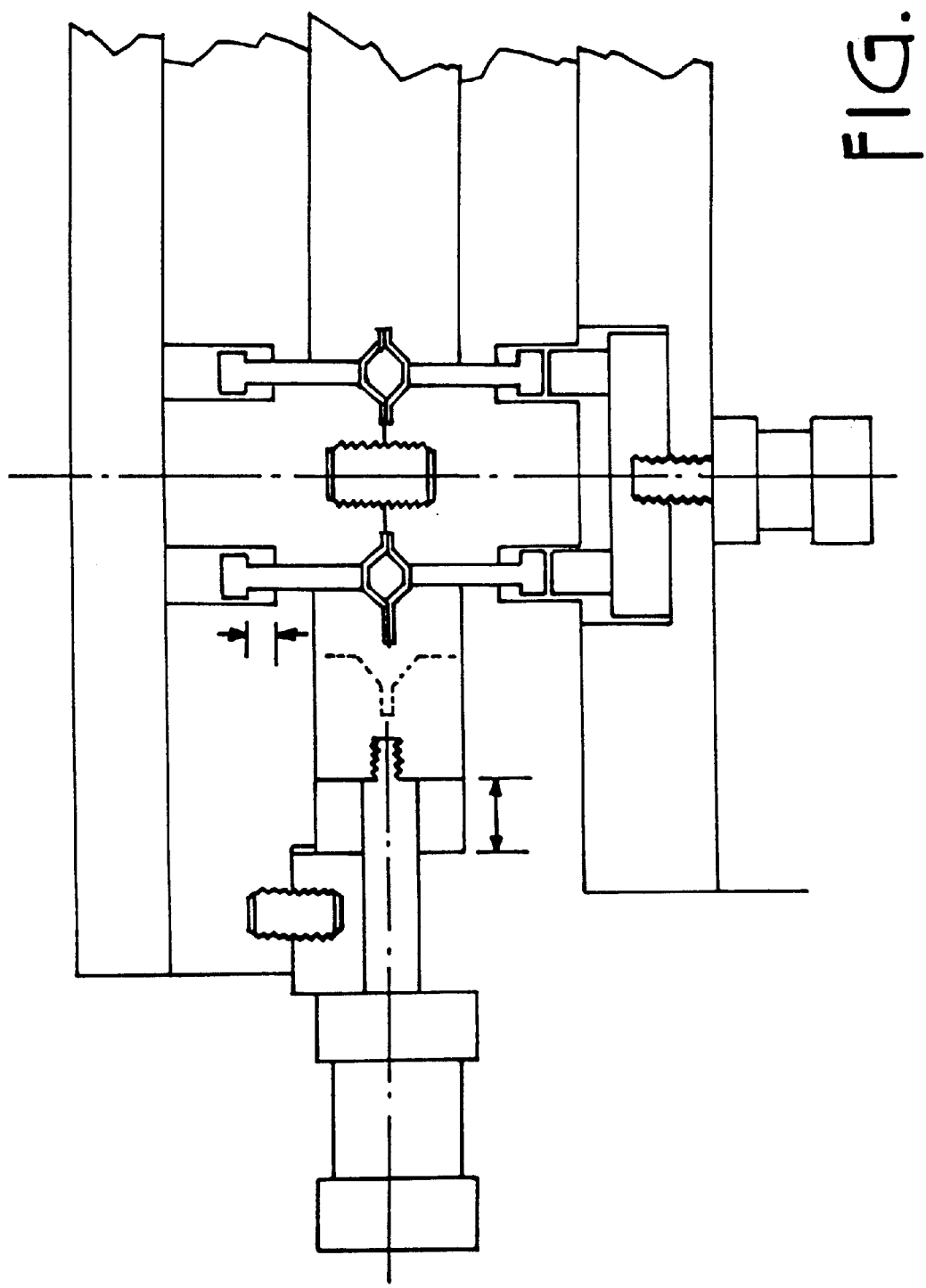
FIG. 7 is a more complete view of the hydroforming structure utilizing the process of the present invention.

FIG. 7 shows a more comprehensive drawing of hydroforming device 250, including multiple components and slides to accommodate the complex configuration blank 210.

While it has been mentioned above that the various blank can easily be fabricated utilizing a roll bonding process, it is further appreciated that other manufacturing methods could easily be used. For example, the blank could easily be fabricated using a welded or appropriate epoxy attachment can be used. Also, the final forming steps could easily use processes other than hydroforming. Other obvious modifications are clearly possible.

Once again, the present invention provides sufficient structural stability to allow the use of aluminum components in weight bearing applications. One way to accomplish this is by creating a unique waffle-type structure, which is capable of appropriately distributing and handling loads encountered. The waffle-type structure is preferably created using the above discussed roll bonding process, resulting in a three-dimensional structure, which is bonded at certain points while having multiple walls at other points. By providing appropriate separation at the unbonded locations, the desired load handling structure can be created. As outlined below in further detail, this structure provides appropriate load transfer and handling characteristics, thus avoiding stress points. Further, the resulting structure is lightweight and cost effective.

Figure 8:
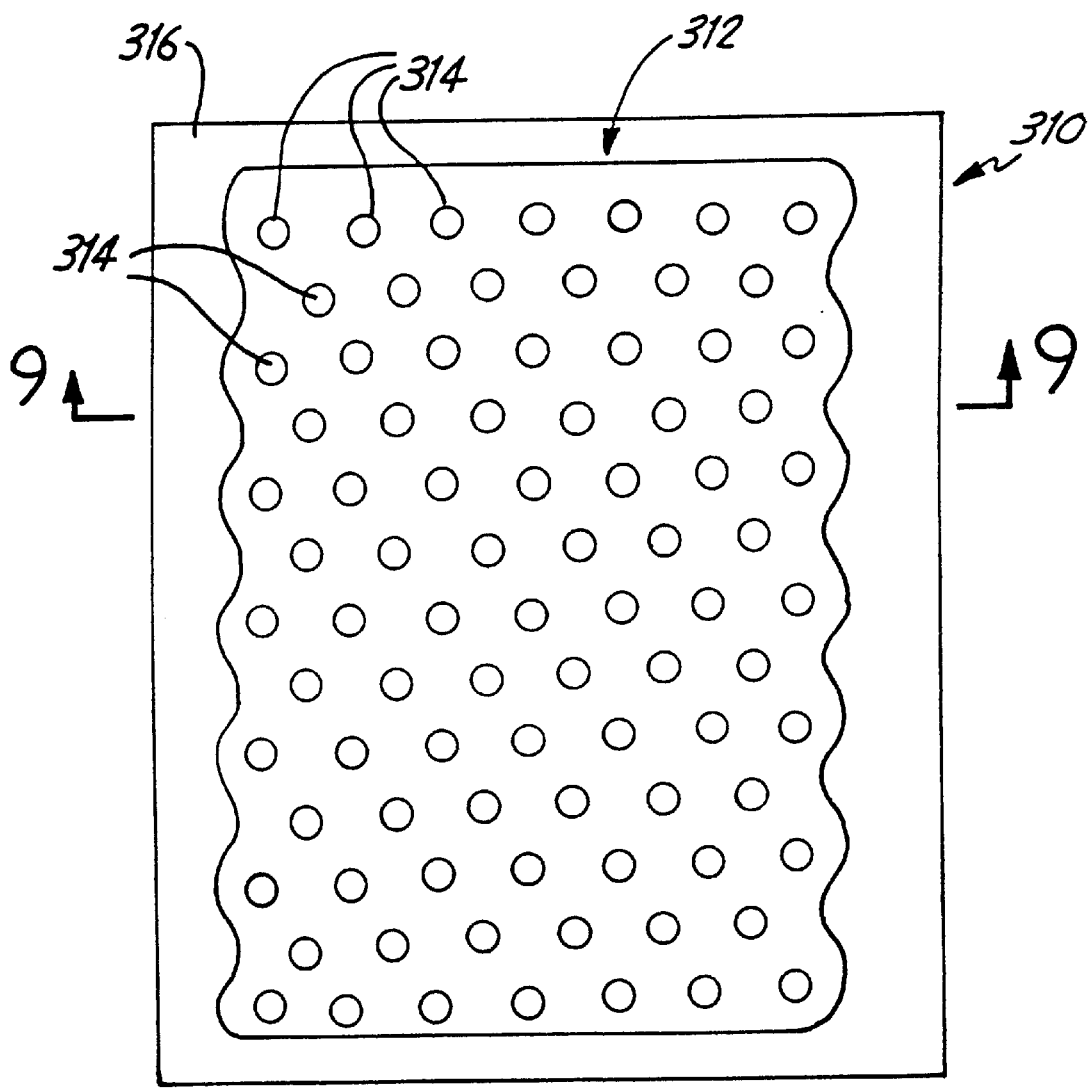
FIG. 8 is a top view of one embodiment of the present invention wherein the desired structure is a formed waffle-type material.
Figure 9:
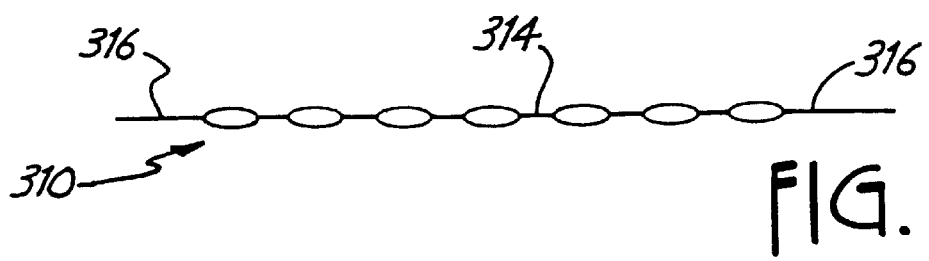
FIG. 9 is a cross-sectional drawing of the waffle-type material shown in FIG. 8, along section line 9—9.
Figure 10:
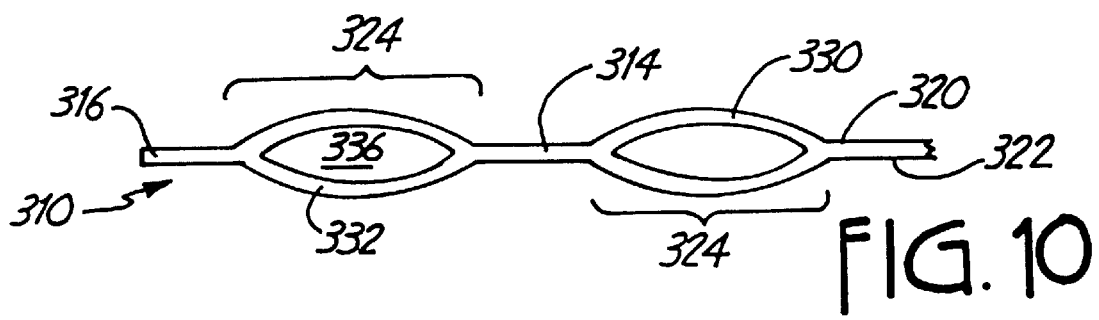
FIG. 10 is a close-up cross-sectional view showing the structural configuration of the waffle-type material.

Referring now to FIG. 8, there is shown a top view of one exemplary roll bonded structure in accordance with the present invention. FIG. 9 illustrates a cross-sectional view of this structure, taken along section line 9—9 of FIG. 8. Similarly, FIG. 10 illustrates a more close-up partial cross-sectional view of the same structure. In FIG. 10, it is easier to see the actual internal structure of the load bearing sheets.

Referring to FIG. 8, the load bearing structure 310 is shown as a substantially rectangular member having a bond pattern 312 located in a central portion thereof. This bond pattern is created using roll bonding techniques, which are generally well-known to those skilled in the art. In summary, roll bonding involves the use of high pressures exerted between two sheets of material to create a bond at certain points therebetween. This bond can be inhibited by utilizing a bond inhibiting compound at desired locations. By appropriately patterning this bond inhibiting compound, several patterns can be easily created.

Referring again to FIG. 8, bond pattern 312 is configured in a substantially grid-like manner. More specifically, a plurality of bond points are appropriately positioned throughout a central portion of structure 310. A peripheral bond 316 is also created around the edges of structure 310. As better illustrated in FIGS. 9 and 10, these bond points are made up of substantially solid structure which extends from a first surface 320 to a second surface 322. At those points where bonds do not exist, an unbonded region 324 is created. In unbonded region 324, the first material sheet 330 and the second material sheet 332 are separated from one another, creating an air gap 336.

Figure 11:
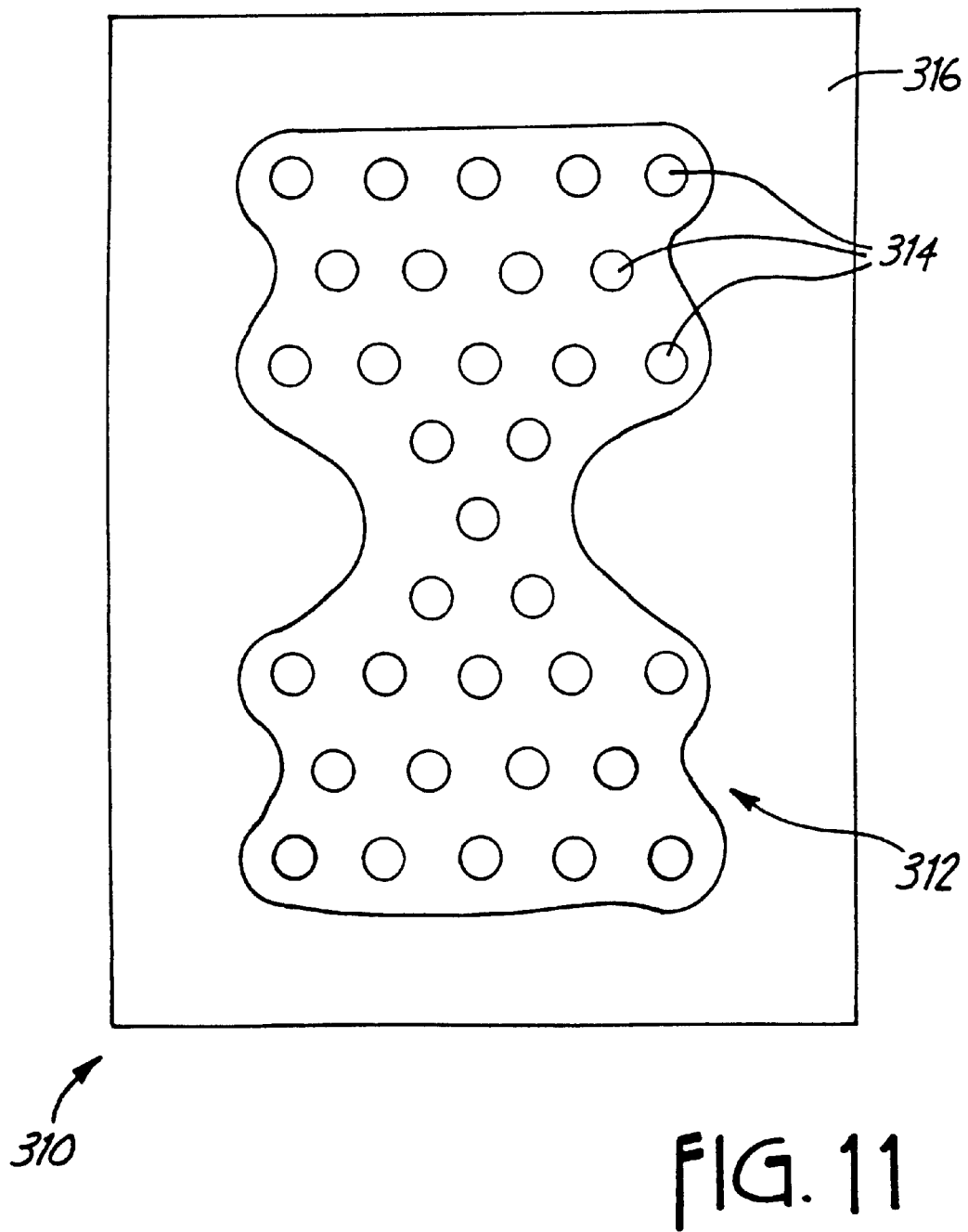
FIG. 11 is an alternative waffle-type structure.

Obviously, the bond pattern can be adapted to several unique configurations, to meet the specific needs of the product involved. Additionally, the amount of separation, or size of air gap 336 can also be varied as necessary. As one illustration, an alternative bond pattern is shown in FIG. 11 having a somewhat hour-glass type shape thereto. This further illustrates how the bond pattern can be altered to best fit the component being considered.

As will be clearly recognized by those skilled in the art, the waffle patterns, and appropriate separation of material between bond points, allows for the easy distribution of loads throughout the material. Because a three-dimensional structure is created, transverse loads and stresses can be managed in a predictable and efficient manner, thus creating a substantially rigid load bearing structure.

Figure 12:
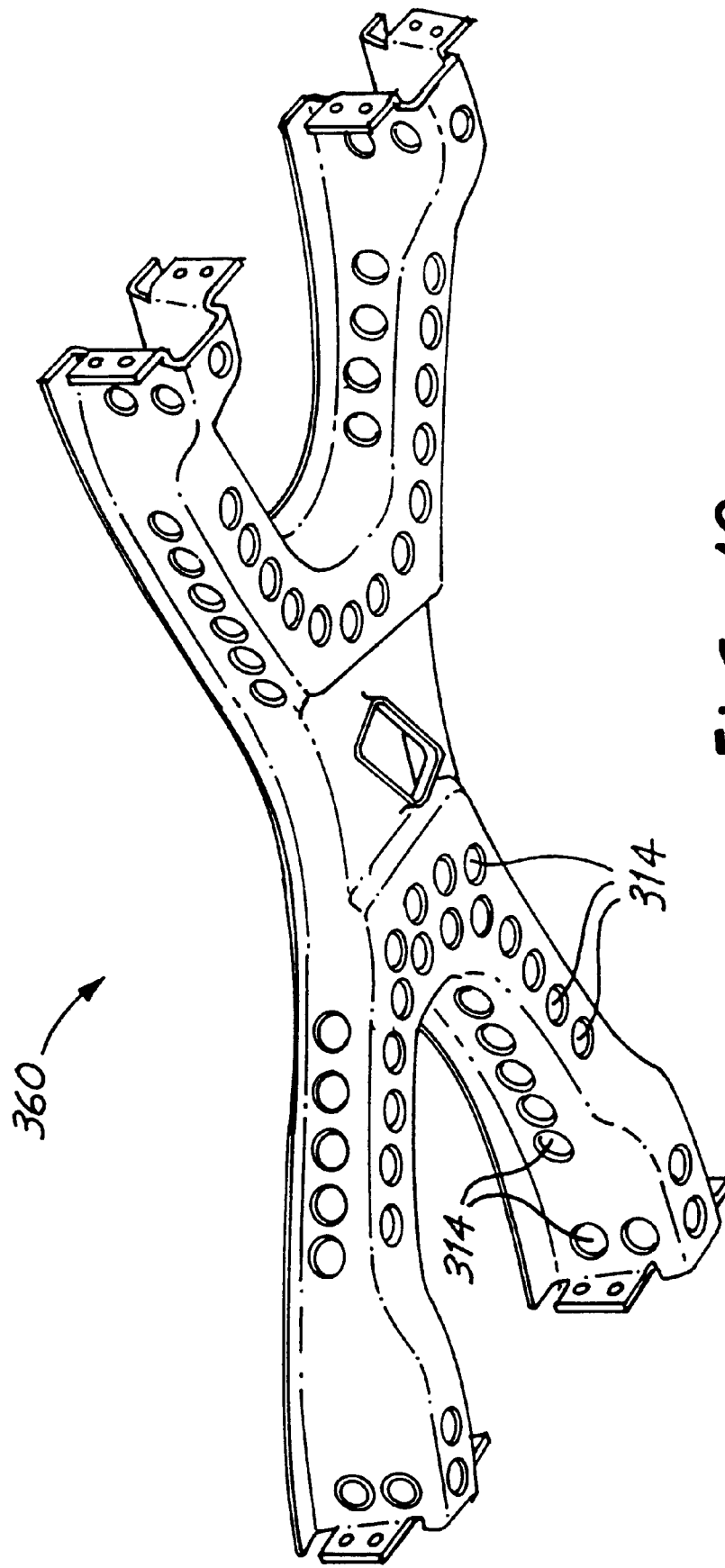
FIG. 12 is a perspective view of an alternative finished component which also displays the waffle-type structure.

Referring now to FIG. 12, there is shown one alternative embodiment of the present invention wherein the waffle-type structure has been further processed to create a cross-member 360. As can be seen, cross-member 360 includes a plurality of bond points 314, spaced at several unique positions throughout. Obviously, cross-member 360 has undergone further processing steps following the bonding process. Specifically, cutting was required to create an appropriate blank, which is then shaped using various methods. For example, die pressing could be used to shape the desired three-dimensional structure. Alternatively, die pressing could be used in conjunction with hydroforming to again create the desired structure.

While the above description has primarily dealt with die cutting and stamping of sheet materials, it is clearly understood that this process is adaptable to many different forming processes. Specifically, a welded tube could be created prior to induction heating. This welded tube could then be used in a hydroforming operation to create the finished part. In that case, the part forming operation 450 shown in FIG. 13 is simply hydroforming. Similarly, the process could be followed, when started with an extruded tube or an extruded product of some type. Once again, hydroforming is easily adaptable to the parts forming operation. Furthermore, a roll bonded blank could be utilized as a starting point, which would be later hydroformed into a completed component. Each of these variations simply highlight the flexibility of the heat treating process described above to form high strength component parts out of structural grade aluminum alloys.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method of heat treating and forming component parts, comprising:

(a) preforming a roll bonded component blank, wherein the component blank is formed of a 6000 series aluminum material having a predetermined initial hardness, wherein preforming a roll bonded component blank comprises:
preheating two sheets; and
roll bonding the sheets substantially immediately following preheating to limit oxidation on the bonding surfaces of the two sheets;
(b) heat treating the roll bonded component blank to a predetermined treatment temperature in a predetermined treatment time, said predetermined treatment temperature being at least approximately 250 degrees C.;
(c) quenching the component blank such that the temperature reaches a predetermined after-quench temperature in a predetermined quench time, the component blank being in a ductile condition after quenching;
(d) forming the component blank into a formed component part while the component blank is in the ductile condition, wherein forming the component blank comprises separating at least a portion of one of the sheets of the roll bonded component blank from the other sheet; and
(e) aging the component part such that the product reaches a predetermined final T-6 hardness.

2. The method of claim 1 wherein the material sheets comprise generally continuous coils of 6000 series aluminum.

3. The method of claim 1 wherein the initial hardness is an F hardness.

4. The method of claim 1 wherein the step of forming comprises hydroforming the component blank.

5. The method of claim 1 wherein the step of forming comprises separating non-bonded regions of the roll bonded component blank to form the component part.

6. The method of claim 5 wherein the step of separating non-bonded regions comprises inflating the component blank to cause separation of the non-bonded regions.

7. A method of heat treating and forming component parts, comprising:
(a) preforming a roll bonded component blank, wherein the component blank is formed of a 6000 series aluminum material having a predetermined initial hardness, wherein preforming a roll bonded component blank comprises:
preheating two sheets; and
roll bonding the sheets substantially immediately following preheating to limit oxidation on the bonding surfaces of the two sheets;
(b) heat treating the roll bonded component blank to a predetermined treatment temperature in a predetermined treatment time, said predetermined treatment temperature being at least approximately 250 degrees C.;
(c) quenching the component blank such that the temperature reaches a predetermined after-quench temperature in a predetermined quench time;
(d) forming the component blank into a formed component part while the component blank is in a ductile condition, wherein forming the component blank comprises separating at least a portion of the roll bonded component blank, wherein the step of forming comprises stamping of components; and
(e) aging the component part such that the product reaches a predetermined final hardness.

8. The method of claim 1 wherein the component blank is continuous cast aluminum having an F temper.

9. The method of claim 1 wherein the predetermined treatment temperature is within the range of 300° C. to 600° C.

10. The method of claim 1 wherein the step of aging comprises storing the component at near room temperature for a period of 7 to 21 days.

11. The method of claim 1 wherein the step of forming is completed within 2 hours following the step of quenching.

12. A method for forming a work hardened component part starting from a material of F-temper aluminum, comprising:
(a) preheating material sheets comprising structural aluminum;
(b) roll bonding the material sheets to form a component part blank, the roll bonding step being performed substantially immediately following preheating the material sheets to limit oxidation on the bonding surfaces of the two sheets;
(c) heating the roll bonded blank to a predetermined temperature in a predetermined period of time;
(d) quenching the roll bonded blank such that the roll bonded blank cools to a predetermined after-quench temperature, the roll bonded blank being in a ductile condition after quenching;
(e) hydroforming the roll bonded blank to form a formed component part while the roll bonded blank is in the ductile condition following quenching; and
(f) aging the component part for a predetermined aging time such that the product reaches a predetermined final hardness within the aging time.

13. The method of claim 12 wherein the predetermined final hardness is a T-6 hardness.

14. The method of claim 12 wherein the component part blank is formed from a plurality of continuous cast aluminum sheets.

15. The method of claim 12 wherein the predetermined treatment temperature is within the range of 300° C. to 600° C.

16. The method of claim 12 wherein the step of aging comprises storing the component at near room temperature for a period of 7 to 21 days.

17. The method of claim 12 wherein the step of hydroforming is completed within 2 hours following the step of quenching.

18. A method for efficiently forming hardened component parts, comprising:
heating at least a portion of two generally continuous cast aluminum sheets or coils of structural aluminum;
roll bonding the at least a portion of the two generally continuous cast aluminum sheets or coils to form a roll bonded sheet, said roll bonding being performed substantially immediately following heating the sheets to limit oxidation on the surfaces of the sheets;
heating the roll bonded sheet to a first predetermined temperature using inductive heating;
quenching the roll bonded sheet by causing its temperature to drop from the first predetermined temperature to a second predetermined temperature in a predetermined period of time, the roll bonded sheet being in a ductile condition after quenching;
forming the roll bonded sheet into a component part within two hours following quenching while the roll bonded sheet is in the ductile condition; and
aging the component part in order to achieve a desired product hardness.

19. The method of claim 18 wherein the step of forming is accomplished by hydroforming.

20. A method for efficiently forming hardened component parts, comprising:

heating at least a portion of two continuous cast aluminum sheets or coils of structural aluminum;

roll bonding the at least a portion of two continuous cast aluminum sheets or coils to form a roll bonded sheet, said roll bonding being performed substantially immediately following heating the sheets to limit oxidation on the surfaces of the sheets;

heating the roll bonded sheet to a first predetermined temperature using inductive heating;

quenching the roll bonded sheet by causing its temperature to drop from the first predetermined temperature to a second predetermined temperature in a predetermined period of time;

forming the roll bonded sheet into a component part within two hours following quenching while the roll bonded sheet is in a ductile condition, wherein the step of forming is accomplished by stamping and die pressing; and storing the component part for a storage period in order to achieve a desired product hardness.

21. The method of claim 18, wherein said at least two continuous cast aluminum sheets comprise at least two rolls of series 6000 aluminum.

22. The method of claim 21 wherein the step of forming is accomplished by hydroforming.

23. The method of claim 18 wherein the step of forming is accomplished by inflating at least a portion of the roll bonded sheet.

24. The method of claim 18 wherein the desired hardness is a T-6 hardness.

25. The method of claim 1, wherein preheating two sheets comprises preheating the two sheets in a controlled environment to limit oxidation on the bonding surfaces of the two sheets.

26. The method of claim 1, wherein preheating two sheets comprises rapidly preheating the two sheets to limit oxidation on the bonding surfaces of the two sheets.

27. The method of claim 12, wherein preheating material sheets comprises preheating material sheets in a controlled environment to limit oxidation on the bonding surfaces of the material sheets.

28. The method of claim 12, wherein preheating material sheets comprises rapidly preheating material sheets to limit oxidation on the bonding surfaces of the material sheets.

29. The method of claim 12, wherein the material sheets comprise 6000 series aluminum.

30. The method of claim 18, wherein heating at least a portion of two generally continuous cast aluminum sheets or coils comprises heating at least a portion of two generally continuous cast aluminum sheets or coils in a controlled environment to limit oxidation on the bonding surfaces of the two generally continuous cast aluminum sheets or coils.

31. The method of claim 18, wherein heating at least a portion of two generally continuous cast aluminum sheets or coils comprises rapidly heating at least a portion of two generally continuous cast aluminum sheets or coils to limit oxidation on the bonding surfaces of the two generally continuous cast aluminum sheets or coils.

32. The method of claim 18, wherein the first predetermined temperature is within a range of approximately 400 degrees C. to 600 degrees C.

* * * * *